United States Patent
Vinson et al.

(10) Patent No.: US 8,003,581 B1
(45) Date of Patent: Aug. 23, 2011

(54) IRON CONTROL AGENT

(75) Inventors: Edward F. Vinson, Snyder, TX (US);
Ricky N. Beard, Granbury, TX (US);
Richard J. Dyer, Midland, TX (US)

(73) Assignee: Chemplex, L.C., Snyder, TX (US)

( * ) Notice: Subject to any disclaimer, the term of this patent is extended or adjusted under 35 U.S.C. 154(b) by 771 days.

(21) Appl. No.: 11/270,353

(22) Filed: Nov. 9, 2005

(51) Int. Cl.
| | |
|---|---|
| *C09K 8/74* | (2006.01) |
| *C09K 8/584* | (2006.01) |
| *C09K 8/532* | (2006.01) |
| *C09K 8/528* | (2006.01) |
| *C09K 8/60* | (2006.01) |
| *C09K 8/04* | (2006.01) |
| *E21B 43/00* | (2006.01) |
| *E21B 37/06* | (2006.01) |
| *E21B 43/26* | (2006.01) |

(52) U.S. Cl. ........ 507/269; 507/252; 507/256; 507/257; 507/258; 507/267; 507/272; 166/304; 166/305.1

(58) Field of Classification Search ........ 507/269, 507/252, 256, 257, 258, 267, 272; 166/304, 166/305.1
See application file for complete search history.

(56) References Cited

U.S. PATENT DOCUMENTS

| | | | | |
|---|---|---|---|---|
| 2,175,081 | A | | 10/1939 | Grebe |
| 2,959,462 | A | * | 11/1960 | Goren ............... 423/260 |
| 3,899,293 | A | * | 8/1975 | Bush ............... 422/15 |
| 4,574,050 | A | | 3/1986 | Crowe et al. |
| 4,683,954 | A | | 8/1987 | Walker et al. |
| 4,823,874 | A | | 4/1989 | Ford |
| 5,063,997 | A | | 11/1991 | Pachla et al. |
| 5,073,270 | A | * | 12/1991 | Gallup et al. ........... 210/698 |
| 5,084,192 | A | | 1/1992 | Dill et al. |
| 5,445,221 | A | | 8/1995 | Vinson |
| 5,622,919 | A | * | 4/1997 | Brezinski et al. ........ 507/90 |
| 6,060,435 | A | * | 5/2000 | Beard et al. ............. 507/258 |
| 6,132,619 | A | * | 10/2000 | Lin et al. ............... 210/662 |
| 6,225,261 | B1 | | 5/2001 | Brezinski et al. |
| 6,306,799 | B1 | * | 10/2001 | Feraud et al. ........... 507/90 |
| 6,308,778 | B1 | | 10/2001 | Girgis-Ghaly et al. |

* cited by examiner

*Primary Examiner* — Timothy J. Kugel
*Assistant Examiner* — Atnaf Admasu
(74) *Attorney, Agent, or Firm* — Locke Lord Bissell & Liddell, LLP

(57) ABSTRACT

An iron control agent capable of reducing ferric iron containing compounds to ferrous iron containing compounds in an acidic solution, such as one used for formation acidizing. The iron control agent comprises a combination of a sulfur dioxide, sulfurous acid, sulfite salts, bisulfite salts, or thiosulfate salts or mixtures thereof, with a source of copper ions and a source of iodine or iodine ions. The iron control agent may also include small amounts of an adjunct such as stannous chloride, 2-mercaptoethanol, and thioglycolic acid and its salts.

22 Claims, No Drawings

IRON CONTROL AGENT

BACKGROUND OF THE INVENTION

1. Field of the Invention

The present invention relates to the reduction of iron from the ferric to the ferrous state in solutions of strong acids, such as those used in oil and gas well stimulation and in the acid cleaning of industrial equipment such as boilers, heat exchangers, and the like. More particularly, it relates to this chemical reduction as an aid in minimizing the formation of solid reaction products during such procedures. Most particularly, it relates to the use of this chemical reduction in the minimization of the occurrence of iron-induced acid sludging of certain crude oils in the course of well stimulation.

2. Description of the Relevant Art

It is well established in the prior art that dissolved iron in the ferric oxidation state in aqueous acid solutions can lead to the formation of ferric iron-containing compounds in the bearing solution which produce insoluble iron solids when the pH of the acid solution increases to a value greater than approximately 4. In this regard, U.S. Pat. No. 4,683,954 to Walker and U.S. Pat. No. 5,084,192 to Dill teach that ferric compounds such as ferric hydroxide begin to precipitate from hydrochloric acid solution when the pH of the acid increases to a value of about 2.5 and greater and that precipitation is complete when the solution's pH is about 3.5. This precipitation phenomenon becomes a serious problem when an acid, such as hydrochloric acid, containing dissolved ferric iron is being used to react with a subsurface, acid soluble, calcareous formation, such as limestone, wherein the acid reaction causes the pH of the acid solution to typically spend to a value greater than the 4 and 5 range.

In addition to the precipitation problem discussed above which can be caused by the presence of ferric ion in acid, it is taught by several authorities that hydrochloric acid, particularly when at high concentrations of about 15% and greater, can cause the development of sludge when the acid is placed in contact with certain types of crude oil. The sludge formation problem is exacerbated when the acid which is in contact with the crude oil also contains ferric ion.

For purposes of this invention, sludge is defined as a solid material formed in crude oil containing asphaltenes and maltenes which constituents may, under certain conditions as pointed out above, precipitate from the crude oil. Sludge formed in crude oil while the crude oil is in a formation can render very difficult the task of recovery of the oil from the formation. Crude oil containing quantities of asphaltenes and maltenes subject to the production of sludge is referred to herein as sludging crude.

Accordingly, the sludging problem specifically addressed herein is caused by the combination of acid, especially high concentration hydrochloric acid, and ferric ion in contact with a sludging crude. This problem is particularly severe when the sludge is produced during formation acidizing.

Formation acidizing or simply, acidizing, is a well known method used to increase the flow of fluid from a subterranean formation. According to conventional practices, the underground formation is contacted with an acidic composition to react with and dissolve material contained therein for the purpose of increasing the permeability of the formation. The flow of fluid from the formation is therefore increased because of the increase in formation permeability caused by the dissolution of the material. A known method of acidizing comprises the steps of conducting an acid composition to the formation through tubing disposed in a borehole that penetrates the formation; forcing the acid composition into contact with the formation and permitting the acid to react with and dissolve certain materials contained therein to enlarge passages through the formation and thus increase the permeability of the medium so treated.

It is apparent that the object of formation acidizing, which is to increase formation permeability, can be frustrated if the very acid composition employed in the treatment to achieve that object produces an environment which fosters the development of solid material which can instead fill and plug pore spaces intended to be enlarged in the treated formation. Instead of enhancing fluid production, the consequent result is a failure to increase production, and even possibly decrease formation permeability.

In the context of formation acidizing, ferric ion can be introduced into the acid as a result of reaction between ferric compounds, such as rust and millscale, contacted in such locations as the tanks used to store the acid and/or transport it to a well that requires acidizing. Most common, such ferric compounds may be encountered on the interior walls of the conduit which conducts the acid down to the formation, reaction of the acid with ferrous compounds in the formation followed by oxidation of ferrous ion to ferric ion, and reaction between the acid and formation minerals that include ferric compounds, such as goethite, $FeO(OH)$, magnetite, $Fe_3O_4$, and hematite, $Fe_2O_3$.

Solutions to the problems of precipitation of ferric iron compounds from spent acid and the formation of sludge induced by the contact between ferric ion and acid with sludging crude revolve about the control of ferric ion in the acid solutions and/or the elimination of those ions from the solution. One suggested mitigating procedure is the removal of ferric compounds from the metal conduits through which the acid solutions are conducted down-hole, such as by a process known as pickling, prior to the conduit's utilization in acidizing procedures.

As long ago as 1939, a portion of this iron problem was recognized by Grebe: his U.S. Pat. No. 2,175,081 teaches of sulfur dioxide or sulfurous acid to lessen the precipitation of iron salts as pH increases after an acid job. Grebe does not address the problem of sludge formation in his patent. The Dill patent ('192) discloses the use of a blend of formic acid and acetic acid, in combination with anti-sludge agents and iron control agents. U.S. Pat. No. 4,823,874 discloses the use of anti-sludging agents such as quaternary ammonium salts of fatty amines in hydrochloric acid. U.S. Pat. No. 4,574,050 to Crowe discloses the use of an iron control agent, such as ascorbic acid and erythorbic acid, in hydrochloric acid. U.S. Pat. No. 5,063,997 to Pachla appears to disclose the reduction of ferric ion to ferrous ion in hydrochloric acid with hypophosphorous acid and catalyst material selected from cupric and cuprous compounds.

In U.S. Pat. No. 5,445,221 to Vinson, the reduction of ferric ion to ferrous ion in hydrochloric acid is disclosed with certain sulfur-containing, non-ionic, organic compounds in combination with a separate catalyst material selected from copper and vanadium compounds. The disclosure of the '221 patent is detailed and accurate with respect to the background of that invention and the needs for ferric ion reduction for applications in oil field settings. For these same purposes of background information regarding the needs and applications for ferric ion and iron reducing capabilities, U.S. Pat. No. 5,445,221 is expressly incorporated herein by reference. U.S. Pat. No. 6,306,799 discloses similar products, and teaches the use of copper and iodine compounds along with organic sulfur compounds for carrying out these same goals.

SUMMARY OF THE INVENTION

This invention concerns a significant improvement over the method described by Grebe in U.S. Pat. No. 2,175,081, which concerns the use of sulfur dioxide in the solutions used to acidize oil and gas wells. This invention also offers an improved alternative method to those described in, for example, U.S. Pat. Nos. 6,030,435 (Beard et al.) and 6,306,799 (Feraud et al.), which concern solutions used in wells and in cleaning of industrial equipment.

Grebe's patent claims the use of sulfur dioxide or its hydrated form, sulfurous acid, in the prevention of precipitation of ferric salts or oxides in well-treating solutions. The methods there do not, however, prevent the formation of "iron-induced sludge" that frequently occurs when such solutions contact crude oils. The Beard and Feraud patents disclose methods to minimize or eliminate sludge formation in well treatments, but both use relatively expensive, obnoxious, and toxic mercaptan compounds to do so.

We have discovered that the use of certain catalysts with sulfur dioxide, sulfurous acid, or agents that produce either of these when added to acidic solutions will help to prevent sludge formation in crude oils, apparently by converting ferric iron to the ferrous form even in acids as strong as 28% hydrochloric acid. Grebe's method appears to effect this reaction only after the acid treating solution has "spent" by reaction with carbonate reservoir rocks. This accomplishes Grebe's goal of preventing precipitation of inorganic ferric compounds, but does nothing to alleviate the problems caused by sludging of oils, now generally known to be the more severe precipitation problem in oil well acidizing.

DETAILED DESCRIPTION OF PREFERRED EMBODIMENTS

We have found that the combination of:
1) sulfur dioxide, sulfurous acid, sulfite salts, bisulfite salts, or thiosulfate salts
with 2) a source of copper ions, such as a cupric or cuprous salt
and 3) a source of iodine or iodide ions, such as iodine, potassium iodide, or other iodide salts will rapidly and efficiently reduce ferric iron to the ferrous form in a variety of acids used in the treatment of crude oil containing formations. Acids tested include hydrochloric acid of any strength up to at least 28%, formic acid, acetic acid, and mixtures of these. These acid solutions, when used to prepare treating solutions for wells by means well-known to those skilled in the art, are very effective in preventing the formation of iron-induced sludge. The solutions of this invention are also anticipated to be less toxic, less odiferous, and more economical that previously used solutions containing primarily mercaptans.

We have also discovered that the addition of certain other reducing agents in small, substoichiometric amounts can increase the rapidity with which this invention reduces ferric iron. Stannous chloride, 2-mercaptoethanol, and thioglycolic acid or its salts are examples of this type of adjuvant. Amounts as low as two mole percent based on ferric iron are effective in giving much more rapid reduction compared to solutions without these adjuvants.

Example I

One hundred milliliters of a solution was prepared in water from 20 grams of sodium sulfite and 6.0 milliliters of a commercial 45% solution of potassium iodide. 1.5 milliliters of this mixture was added to 100 milliliters of a 15% solution of hydrochloric acid containing 1250 parts per million ferric iron in the form of ferric chloride. The solution was stirred briefly and allowed to stand, covered, for 15 minutes. The yellow color of ferric iron in solution was still apparent at the end of this period.

Example II

The experiment of EXAMPLE I was repeated, but with potassium iodide omitted and with the addition of 0.1 milliliter of a commercial 40% solution of cupric chloride dihydrate to the hydrochloric acid. The yellow color of ferric iron in solution was still apparent at the end of fifteen minutes.

Example III

The experiment of EXAMPLE I was repeated, but with the addition of 0.1 milliliter of the cupric chloride solution of EXAMPLE II to the hydrochloric acid. The yellow color of ferric iron was almost completely discharged at the end of fifteen minutes' standing.

Example IV

The sodium sulfite solution of EXAMPLE I was replaced with a solution of 20 grams of sodium sulfite and 4.0 milliliters of a commercial solution of 71% ammonium thioglycolate in 100 milliliters of water. 1.5 milliliters of this mixture and 0.1 milliliter of 40% cupric chloride solution were added to 100 milliliters of iron-bearing hydrochloric acid as before. A very slight lessening of the yellow color of ferric iron was noted over fifteen minutes' standing.

Example V

One hundred milliliters of a solution was prepared containing 20 grams of sodium sulfite, 6.0 milliliters of 45% potassium iodide, and 4.0 milliliters of 71% ammonium thioglycolate. 1.5 milliliters of this solution and 0.1 milliliter of 40% cupric chloride solution were added to acid as above: the yellow color of ferric iron was completely discharged in less than two minutes.

Example VI

Similarly to EXAMPLE V, a mixture was prepared from 100 milliliters of commercial 70% ammonium bisulfite solution, 6.0 milliliters of 45% potassium iodide, and 4.0 milliliters of 71% ammonium thioglycolate. The addition of 0.5 milliliter of this mixture to acid along with 0.1 milliliter of 40% cupric chloride as before again reduced all the ferric iron present within two minutes as shown by the change of color.

We claim:
1. An iron control agent for reducing ferric iron-containing compounds to ferrous iron-containing compounds in a strongly acidic solution to reduce iron-induced acid sludging during acid stimulation of production in oil wells, said control agent comprising:
 a sulfur compound selected from the group consisting of sulfur dioxide, sulfurous acid, sulfite salts, bisulfite salts, and mixtures thereof;
 a source of copper ions; and
 a source of iodine;
 wherein the iron control agent is capable of reducing ferric iron containing compounds to ferrous iron containing compounds in an acidic solution that contains a sufficient amount of an acid to dissolve at least a portion of an underground formation.

2. The iron control agent of claim 1 wherein the sulfur compound is selected from the group consisting of sodium sulfite, ammonium bisulfite, and mixtures thereof.

3. The iron control agent of claim 1 wherein the source of copper ions is cupric chloride.

4. The iron control agent of claim 1 wherein the source of iodine is selected from the group consisting of iodine, potassium iodide, other iodide salts, and mixtures thereof.

5. The iron control agent of claim 4 wherein the source of iodine is potassium iodide.

6. The iron control agent of claim 1 further comprising an adjunct selected from the group consisting of stannous chloride, 2-mercaptoethanol, thioglycolic acid or its salts, and mixtures thereof.

7. The iron control agent of claim 6 wherein the adjunct is present in a sub-stoichiometric amount that is greater than about 2 mole percent based on an amount of ferric iron present in the acid solution.

8. The iron control agent of claim 1 wherein:
   the sulfur compound is further selected from the group consisting of sodium sulfite, ammonium bisulfite, and mixtures thereof;
   the source of iodine is potassium iodide; and
   the source of copper ions is cupric chloride.

9. The iron control agent of claim 8 further comprising ammonium thioglycolate.

10. An acid treatment fluid for formation acidizing of an underground formation comprising:
    a strong acid in an amount sufficient to dissolve at least a portion of an underground formation;
    a sulfur compound selected from the group consisting of sulfur dioxide, sulfurous acid, sulfite salts, bisulfite salts, and mixtures thereof;
    a source of copper ions; and
    a source of iodine;
    said sulfur compound being present in an amount sufficient to reduce iron-induced acid sludging during said acid treatment.

11. The acid treatment fluid of claim 10 wherein the acid is selected from the group consisting of formic acid, acetic acid, hydrochloric acid, and mixtures thereof.

12. The acid treatment fluid of claim 10 wherein the acid has a strength up to about 28%.

13. The acid treatment fluid of claim 10 wherein:
    the sulfur compound is selected from the group consisting of sodium sulfite, ammonium bisulfite, and mixtures thereof;
    the source of iodine is potassium iodide; and
    the source of copper ions is cupric chloride.

14. The acid treatment fluid of claim 10 further comprising ammonium thioglycolate.

15. A method of reducing ferric compounds to ferrous compounds in during acid stimulation of hydrocarbon-producing wells by:
    selecting an acid treatment solution containing an amount of strong acid sufficient to dissolve at least a portion of a subterranean formation;
    adding to the acid treatment solution an iron control agent comprising a sulfur compound selected from the group consisting of sulfur dioxide, sulfurous acid, sulfite salts, bisulfite salts, and mixtures thereof; a source of copper ions; and a source of iodine; and then
    contacting the acid treatment solution containing the iron control agent with the subterranean formation to reduce iron-induced acid sludging during stimulation.

16. The method of claim 15 wherein the sulfur compound is selected from the group consisting of sodium sulfite, ammonium bisulfite, and mixtures thereof.

17. The method of claim 15 wherein the source of copper ions is cupric chloride.

18. The method of claim 15 wherein the source of iodine is potassium iodide.

19. The method of claim 15 further comprising ammonium thioglycolate.

20. The method of claim 15 wherein the sulfur compound is sodium sulfite, the source of iodine is potassium iodide, and the source of copper ions is cupric chloride.

21. The method of claim 15 wherein the acid is selected from the group consisting of formic acid, acetic acid, hydrochloric acid, and mixtures thereof.

22. The method of claim 15 wherein the acid has a strength up to about 28%.

* * * * *